US005176874A

United States Patent [19]

Mourer et al.

[11] Patent Number: 5,176,874

[45] Date of Patent: Jan. 5, 1993

[54] CONTROLLED PROCESS FOR THE PRODUCTION OF A SPRAY OF ATOMIZED METAL DROPLETS

[75] Inventors: David P. Mourer, Danvers; Roy W. Christensen, Northborough, both of Mass.

[73] Assignee: General Electric Company, Cincinnati, Ohio

[21] Appl. No.: 788,012

[22] Filed: Nov. 5, 1991

[51] Int. Cl.[5] ...................... B23K 15/00; C21D 11/00; B22D 23/00

[52] U.S. Cl. ........................................ 266/80; 75/338; 75/339; 164/155; 266/92; 266/94; 266/202

[58] Field of Search ..................... 266/80, 92, 94, 202; 75/338, 339; 164/155

[56] References Cited

U.S. PATENT DOCUMENTS

| | | | |
|---|---|---|---|
| 2,618,013 | 11/1952 | Weigand et al. | 18/2.5 |
| 3,099,041 | 7/1963 | Kaufmann | 18/2.6 |
| 3,342,250 | 9/1967 | Treppschuh et al. | 164/50 |
| 3,826,598 | 7/1974 | Kaufmann | 425/7 |
| 4,067,674 | 1/1978 | Devillard | 425/8 |
| 4,077,457 | 3/1978 | Hashio et al. | 164/155 |
| 4,218,410 | 8/1980 | Stephan et al. | 264/8 |
| 4,295,808 | 10/1981 | Stephan et al. | 425/8 |
| 4,355,787 | 10/1982 | Hannes et al. | 266/92 |
| 4,544,404 | 10/1985 | Yolton et al. | 75/0.5 |
| 4,583,717 | 4/1986 | Hasegawa et al. | 266/92 |
| 4,656,331 | 4/1987 | Lillquist et al. | 219/121.47 |
| 4,966,201 | 10/1990 | Svec et al. | 138/141 |
| 5,054,539 | 10/1991 | Keutgen et al. | 164/155 |
| 5,122,047 | 6/1992 | Bauckhage et al. | 266/202 |

FOREIGN PATENT DOCUMENTS

| | | |
|---|---|---|
| 54442 | 1/1979 | Japan . |
| 57-75128 | 5/1982 | Japan . |
| 1296288 | 11/1972 | United Kingdom . |
| 1514379 | 6/1978 | United Kingdom . |
| 1529858 | 10/1978 | United Kingdom . |
| 2117417A | 10/1983 | United Kingdom . |
| 2142046B | 1/1987 | United Kingdom . |

*Primary Examiner*—Upendra Roy
*Attorney, Agent, or Firm*—Jerome C. Squillaro; Carmen Santa Maria

[57] ABSTRACT

A process and apparatus for producing a spray of atomized metal droplets includes providing an apparatus that forms a spray of molten metal droplets, the apparatus including a metal source and a metal stream atomizer, producing a stream of liquid metal from the metal source, and atomizing the stream of liquid metal with the metal stream atomizer to form the spray of molten metal droplets. A controlled spray of atomized metal droplets is achieved by selectively varying the temperature of the droplets in the spray of molten metal droplets, the step of selectively varying including the step of varying the flow rate of metal produced by the metal source, responsive to a command signal, and sensing the operation of the apparatus and generating the command signal indicative of the operation of the apparatus. The step of atomizing may be accomplished by directing a flow of an atomizing gas at the stream of liquid metal, and then selectively controlling the flow rate of the atomizing gas.

10 Claims, 5 Drawing Sheets

CONTROLLED PROCESS FOR THE PRODUCTION OF A SPRAY OF ATOMIZED METAL DROPLETS

BACKGROUND OF THE INVENTION

This invention relates to the production of articles from atomized metals, and, more particularly, to the formation and control of a spray of atomized metal droplets and apparatus for producing articles in this manner.

In a common method of forming metallic articles, a metal alloy is melted and then cast into a mold. The mold cavity may have the shape of the final article, producing a cast article. Alternatively, the mold cavity may have an intermediate shape, and the resulting billet or ingot is further processed to produce a wrought final article. In either case, the solidification rate of the metal varies over wide ranges and produces wide variations in structure, particularly where the article is large in size. Moreover, the internal metallurgical microstructure of the article often has irregularities that interfere with its use. Such inhomogeneities such as chemical segregation and variations in grain size, and irregularities such as voids, porosity, and non-metallic inclusions, may persist after considerable efforts to remove them.

Articles may also be produced through the use of melt atomization techniques. In this approach, metal is melted and atomized into small droplets. The droplets may be permitted to solidify in that form as powder, and the powder is formed into the article. Although this approach would seem to be rather indirect, it has important advantages in achieving higher and more uniform solidification rates of the structure, more regular metallurgical microstructures, and reduced waste as compared with machined products. A related technique is to deposit the spray of molten droplets onto a form or substrate, gradually building up the mass of metal until the article is formed. The article may be of the final form required, or a billet that is further processed to the final form. This approach is used to achieve rapidly solidified structures with homogeneous metallurgical microstructures, and which may require little subsequent processing to the final form.

Although the metal spraying approach substantially improves the structure of the article, the process may be improved by achieving better control of the metal spray. For example, the characteristics of the final article may depend upon the way in which the spray of molten metal droplets is formed. Or, in the approach where the spray of articles is deposited upon a substrate, even when a relatively regular shape such as a cylindrical billet is formed by metal sprayed onto an end of the billet, the microstructure near the outer periphery of the billet is usually finer in scale than that near the centerline of the billet. The outer periphery cools faster than does the centerline, which may result in difficulty in adhering the sprayed particles to the areas on the periphery, thereby reducing process yield, and may result in centerline porosity, cracking, and distortion. Additionally, some molten materials, including the reactive metals such as titanium, are extremely reactive with the ceramic materials necessary for producing metallic and metallic-based products by conventional techniques. Processes for the production of such materials, for example spray atomization to produce metal droplets and powder (upon solidification) are uneconomical due to the short production runs achievable. Alternatively, with longer runs, the contamination levels become unacceptable from a mechanical properties standpoint because properties such as low cycle fatigue are strongly influenced by foreign particle contamination of the melt, in particularly due to contamination from non-metallic inclusions.

Further, the nozzle may be linked to a cold hearth melting system wherein the molten material only contacts a skull of the same composition as the melt, precluding contamination from the melt containment vessels or flow control nozzle. Coupling a semi-continuous feed system to a cold hearth melting system and the invention disclosed herein enables extended economical production of a spray of atomized metal droplets. Such systems are described in copending, related application Ser. No. 07/679,816 and concurrently filed, copending application 13DV-10629, incorporated herein by reference.

There is therefore a need for an improved technique for producing a spray of molten metal and depositing sprayed metal particles onto substrates, to achieve more regular macrostructures and microstructures. The present invention fulfills this need, and further provides related advantages.

SUMMARY OF THE INVENTION

The present invention provides both apparatus and a technique for improving the macrostructure and microstructure of articles formed by a metal spray approach. The approach permits the metal spraying process to achieve more uniform, controllable structures than heretofore possible. It also provides improved control over the metal spraying equipment and stability against fluctuations in performance. It can be implemented using existing metal spraying equipment with relatively modest additional cost.

In accordance with the invention, a process of producing a spray of atomized metal droplets comprises the steps of providing an apparatus that forms a spray of molten metal droplets, the apparatus including a metal source and a metal stream atomizer, producing a stream of liquid metal from the metal source, and atomizing the stream of liquid metal with the metal stream atomizer to form the spray of molten droplets. Control is achieved by selectively varying the temperature or heat content of the droplets in the spray of molten metal droplets, the step of selectively varying including the step of varying the flow rate of metal produced by the metal source, responsive to a command signal, and sensing the operation of the apparatus and generating the command signal indicative of the operation of the apparatus.

In another aspect of the invention, a process of forming a solid article comprises the steps of producing a stream of liquid metal from a source of liquid metal, selectively varying the flow rate of the stream of liquid metal responsive to a first command signal and a second command signal, and atomizing the metal stream to form a spray of atomized metal droplets directed at a solid substrate positioned such that the metal droplets adhere to the substrate. The first command signal is indicative of the position of the impact of the spray of metal droplets on the solid substrate, and the second command signal is indicative of the operation of the source of liquid metal.

The atomization is often accomplished by the impingement of a stream of gas on the metal stream. The spray of atomized droplets can be characterized in terms of the ratio (G/M ratio) of the mass flow rate of the atomizing gas G to metal mass flow rate M. The higher this ratio, the cooler is the metal in the spray. Different regions on a substrate may require different G/M ratios of the sprayed metal in order to achieve optimization of the structure. For example, the metal sprayed onto an outer portion of a cylindrical billet article substrate near its periphery cools faster after impact than does metal sprayed onto the inner portion near the centerline of the billet. Thus, to achieve a more uniform deposited structure throughout the billet article, it is desirable to have the metal spray be hotter (low G/M) when it is directed at the outer region and cooler (high G/M) when it is directed at the inner portion of the billet or article.

In principle, either the gas (G) content or the metal (M) content of the spray can be varied to control the G/M ratio. Because the metal has a much higher heat capacity than the gas and solidifies from the cooling of the gas, attainable changes in the metal flow rate have a much greater effect on the G/M ratio than do changes in the gas content. Moreover, the gas content cannot be readily varied over wide ranges due to the need to attain full atomization of the stream. The presently preferred approach therefore is directed to controlling the flow rate of the metal in the atomized metal spray.

The metal spray apparatus is provided with a controllable spray nozzle or other device that selectively varies the flow rate of the stream of liquid metal. The selected flow rate is controlled by a command signal that is generated from provided information about the location of the substrate that is being sprayed and the direction of the metal spray. The liquid metal flow rate may also be adjusted based on the performance of the metal source.

Where the command signal is indicative of the position of the impact of the spray on the substrate, the command signal is generated from information about the relative location and orientation of the spray and the substrate. In the example discussed earlier of the billet, if the spray is directed against the outer portion of the billet, the metal flow rate is increased to produce a lower G/M ratio and hence a hotter spray. Conversely, if the spray is directed against the inner portion of the billet, the metal flow rate is decreased to produce a higher G/M ratio and a cooler spray.

The command signal may also be indicative of the operation of the metal source. For example, a fluctuation in the pressure of the metal flowing from the source might be due to a variation in the hydrostatic head (molten metal height) in the melting hearth. The command signal would reflect this smaller hydrostatic head and modify the flow rate of metal M until the steady state hydrostatic head was regained by varying the amount of metal supplied to the melting hearth. However, if the flow rate of metal is changed, the G/M ratio naturally changes. The present process may be operated in any of several ways responsive to this change in G/M ratio. The flow rate of atomizing gas G can readily be varied to maintain the G/M ratio constant, with the flow rate of atomizing gas being continuously adjusted as the level of metal in the hearth returns to its proper level. Alternatively, manipulation of the spray deposit may be adjusted to maintain a uniform deposition profile at the lower metal flow rates until the hearth returns to its proper level. In another type of response to the variation in metal height, a command signal can be provided to the mechanism that positions the metal spray head relative to the billet article such that the metal spray would be directed predominantly toward the regions requiring the sprayed droplets having the currently available G/M ratio until the hydrostatic head has returned to normal.

An important result of these control modes is that the deposits of sprayed metal are more uniform across the entire deposited face, than if no metal flow control were provided. The combination of heat content of the metal and position on the substrate maintains the character of the sprayed droplets relatively uniform, so that the structure of the deposited metal has less variation across the face of the substrate.

In another situation that may occur in practice, the temperature or superheat of the molten metal stream may vary from that desired to produce the optimum metallurgical microstructure. In that event, the variation may be accommodated by controllably varying the gas flow rate G, the metal flow rate M, the location of deposition, or some combination thereof, until the temperature returns to the steady state value.

The present invention also contemplates apparatus for producing articles having uniform microstructure and uniform macrostructure. The articles are formed by the apparatus by an incremental buildup of a metal by deposition of droplets of a metal spray formed from a stream of molten metal. The metal is incrementally deposited onto a substrate.

The article itself has a periphery portion and a central portion. The apparatus controls the temperature of the droplets so that the spray droplets deposited onto the periphery are at a lower temperature than the droplets deposited at the central portion of the article. Because of the mechanisms of heat transfer, this deposition pattern will produce a more uniform cooling rate throughout the article, which in turn will produce an article having a substantially uniform microstructure and a uniform macrostructure.

The apparatus is comprised of a vessel having water-cooled walls. The water-cooled walls naturally contain the metal within the vessel. The metal may be melted within the vessel or may be melted in another melt source and introduced into this melt vessel. The vessel also includes a nozzle for discharging the molten metal from the vessel. The nozzle is located at some point in the vessel below the molten metal. It is preferable that the nozzle have the ability to vary the flow rate of the metal discharged from it, although this is not an absolute prerequisite since the metal discharged may also be controlled to some extent, by controlling the metal head, that is the height of the molten metal above the nozzle opening extending into the vessel.

The molten metal discharged through the nozzle is in the form of a stream. The stream is directed to a means for forming a metal spray. The metal stream is introduced into an inlet and a metal spray is discharged from an outlet. Although any means may be used, the preferred apparatus spray forming means is a gas jet. This type of mechanism includes a gas plenum, a gas source, such as an inert gas tank, and a connection between the tank and the plenum to allow the inert gas to flow between the source and the plenum. Within the plenum, a gas jet is directed at the metal stream, so that a metal spray forms. A gas regulator device positioned between the gas source and the gas plenum controls the flow of gas from the gas source to the plenum, maintaining the gas flow rate at a predetermined level, as required. The metal spray forming means is preferably positioned directly below the nozzle so that the molten metal stream may be gravity fed to the spray forming means.

Several sensors are used in the apparatus to regulate and control the process. A source sensor is preferably positioned above the surface of the molten metal in the vessel, although the sensor may be positioned within the pool. This sensor monitors both the temperature of the molten metal pool and the height of the molten metal pool within the vessel. This sensor may be a single unit having two separate elements, or may be two individual units. A stream sensor is positioned below the nozzle and in close proximity to the molten metal stream discharged from the nozzle. This sensor detects the temperature of the metal stream before it enters the spray forming means. A stream diameter sensor, also located in proximity to the molten metal stream and below the nozzle, monitors the diameter of the metal stream as it exits the nozzle, and before it enters the spray forming means. Each of these sensors is capable of transmitting a signal, and does transmit a signal, indicative of the function monitored.

The apparatus also includes a mounting apparatus for holding and positioning the substrate relative to the metal spray. The mounting apparatus includes at least one sensor for indicating the position of the substrate within the mounting apparatus which transmits a signal or signals indicative of the substrate position within the mounting apparatus.

The spray forming means also includes a positioning sensor which indicates the position of the spray outlet and which transmits a signal indicative of the spray outlet. This sensor permits the determination of the direction of the spray.

The apparatus also includes a multi-channelled controller which is capable of receiving and transmitting signals. The controller receives signals from each of the sensors. These signals allow the controller to determine if each of the monitored functions is at a preselected and predetermined level. In response to these signals and the appropriate determination, the controller transmits signals to modify any of the monitored functions as required.

The apparatus also includes means for adjusting each of the monitored functions in response to signals transmitted by the controller. To control the temperature of the molten metal in the vessel, a heat source is positioned above the vessel. The heat source adjusts the temperature of the molten metal in response to the signal from the controller. Although any heating means may be used, a plasma torch or an electron gun are preferred heating means.

The spray forming means includes a means for moving the spray forming means in response to a signal from the controller. A motor activated in response to the signal is typically used. The mounting apparatus includes a similar means operated in a similar fashion.

The apparatus also includes a means for adjusting the diameter of the molten metal stream in response to a signal from the controller. This is in response to a signal from the controller. This means may be an adjustable nozzle. The means for adjusting the metal diameter may quite simply be controlling the height of the metal in the vessel, since the diameter can be controlled, to a small extent, by the metal head. However, this means is not rapidly responsive to major required changes of the stream diameter. A preferred adjustable nozzle includes a means for generating an electromagnetic field which substantially surrounds the nozzle and which exerts an electromagnetic force on the molten metal stream. The means for generating the force is responsive to a signal from the controller so that the force is varied, thereby increasing or decreasing the diameter of the stream by varying the electromagnetic field, as required to maintain or modify the diameter to a preselected value. The preferred means for generating an electromagnetic field includes a water-cooled current-carrying buss bar and a RF power supply. The buss bar is preferably made of copper and has a rectangular or square cross-section.

To illustrate the capability of the apparatus, the controller, for example, is able to monitor and adjust, as necessary, the temperature of the molten metal in the vessel by controlling the heat source, the deposition of the metal spray on the substrate by controlling the spray direction and the substrate position, the rate of deposition on the substrate by controlling the amount of spray formed by controlling the stream diameter, and the temperature of the deposited metal by controlling gas flow rate and temperature of the metal in the vessel.

The apparatus may optionally include a separate melt source which provides molten metal to the molten-metal containing vessel. This melt source is capable of receiving a signal from the controller to provide molten metal to the vessel. When the source sensor detects that the molten metal in the vessel has fallen below a preselected height, a signal may be transmitted to the controller, which in turn transmits a signal to the separate melt source, which transfers metal to the melt vessel. Such a separate melt source has the advantage of being able to quickly respond to a decrease in the metal height by providing an available, ready pool of molten metal at or close to the desired temperature.

However, the system is tolerant of metal supply fluctuations that may occasionally occur, while still maintaining a uniform macrostructure and microstructure of the deposited metal.

Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENTS

Figure 1:
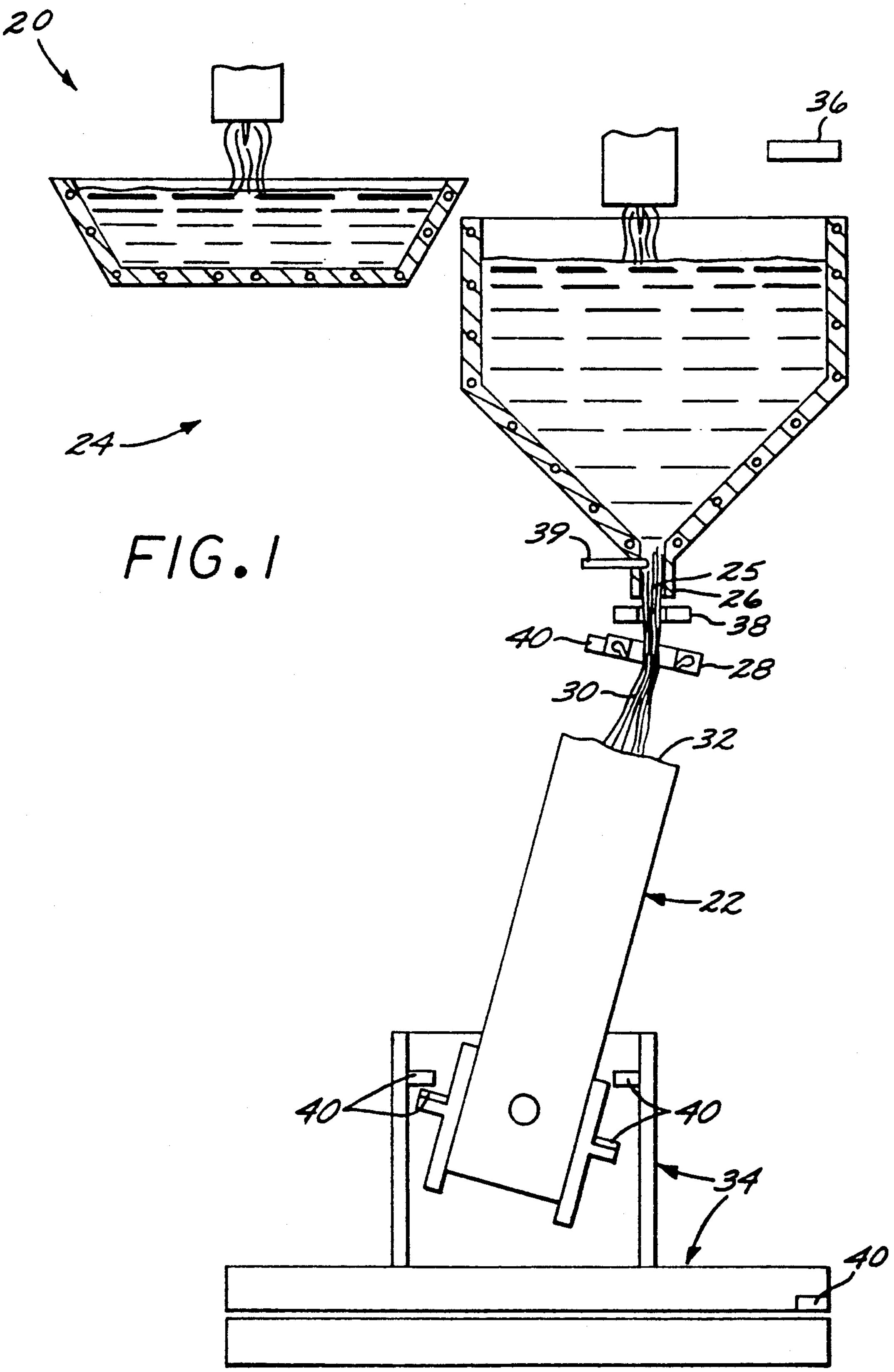
FIG. 1 is a diagrammatic view of a metal spray system.

Referring to FIG. 1, a system 20 forms a spray of molten metal droplets and deposits the droplets as solid sprayed metal to form an article 22. The system 20 includes a source 24 of molten metal that provides a stream 25 of the metal to a variable flow nozzle 26. The source 24 is of any type known in the art, but is preferably a cold-hearth type source wherein a metal skull forms between the molten metal and the water-cooled hearth.

The nozzle 16 controls the flow rate of the metal stream therethrough. The portion of the metal stream that passes through the nozzle 26 is disintegrated into droplets by an atomizer, which preferably includes a gas injection ring 28 that directs an inward flow of inert gas against the stream of metal. Responsive to the impingement of the gas stream, the metal stream 25 breaks up into a metal spray 30 of small metal droplets. In the apparatus depicted in FIG. 1, the metal spray 30 impacts against a substrate 32 and solidifies. Alternatively, the atomized metal droplets may be permitted to solidify during free flight in a cooling tower and thereafter collected. In another embodiment, the melt stream may be atomized by directing it onto a rotating atomization device such as a spinning disk or cup, after which solidification may occur in free flight.

The partially formed article 22 that provides the substrate 32, here illustrated as a billet being spray formed, is mounted in a manner that the spray 30 can be controllably directed against any selected region of the substrate 32. That direction and selective positioning of the spray with respect to the substrate can be supplied in any acceptable manner. For example, the atomizer gas ring 28 can be pivotably mounted so that it can pivot to change the direction of the metal stream as it is atomized to form the metal spray 30. The entire substrate 32 can be mounted in a holder 34 that permits the substrate to be rotated and translated as required to bring selected locations on the substrate into the path of the metal spray 30. Combinations of these approaches can be used. The method of positioning the spray 30 with respect to the substrate 32 is not critical, as long as such positioning can be accomplished.

The system 20 desirably provides sensors by which the operation of the various components may be monitored. A source sensor 36 monitors the level of the melt and the surface temperature of the melt in the source 24. Source sensor 36 may be a single device capable of monitoring both temperature and fluid level, or two separate devices, one for temperature and one for fluid level. Although any source sensor may be used, it is preferred, particularly for the reactive metals, that an image analyzer directed at the surface, capable of monitoring fluid levels and/or surface temperature be used. An acceptable source sensor 36 is disclosed in U.S. Pat. Nos. 4,687,344 and 4,656,331, whose disclosures are incorporated by reference. Such a source sensor 36, coupled with an analyzer, is available from Colorado Video as its Model 635 position sensor. An optical pyrometer or similar device is used to monitor the surface temperature of the melt. A stream diameter sensor 38 monitors the diameter of the stream 25 (and hence its metal flow rate M) after the stream 25 has passed through the nozzle 26. With a suitable input signal, the Colorado Video Model 635 position sensor may be used as the sensor 38. A stream temperature sensor 39 such as an optical pyrometer monitors the temperature, and thence level of superheat, of the molten metal in the stream 25 and thence the temperature of droplets in the spray 30. Conventional position sensors 40 monitor the position of the substrate 32 relative to the metal spray 30. Such position sensors 40 can include angular position sensors for the pivoting gas ring 28, where the ring is pivotable, or angular, rotational, or linear position sensors for the holder 34. All of the sensors 36, 38, 39, and 40 preferably produce a digital output directly or through a sensor controller.

Figure 2:
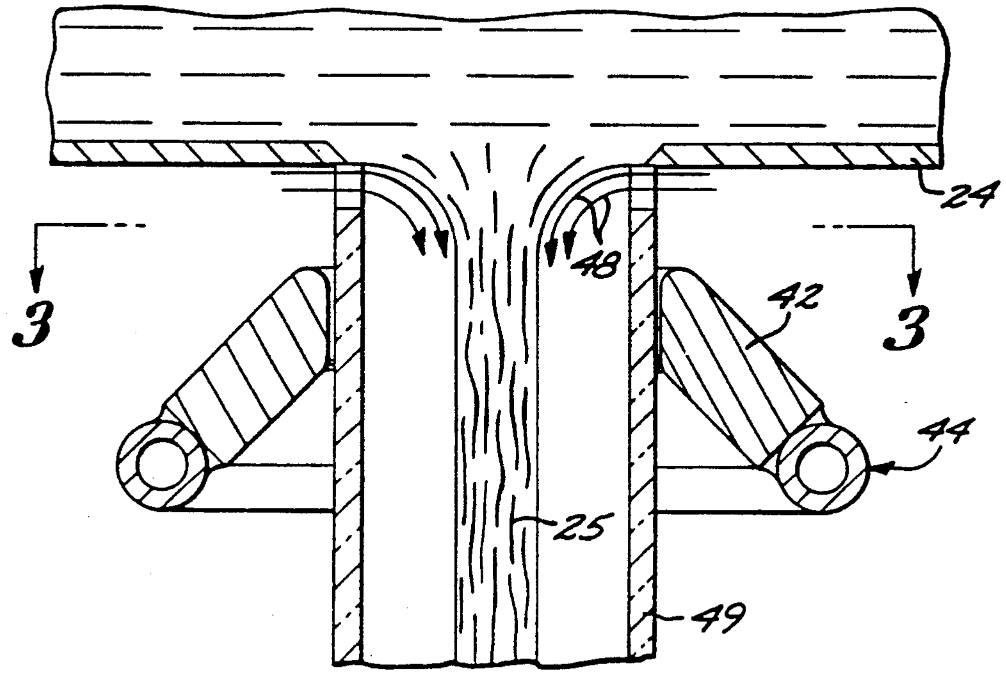
FIG. 2 is a side sectional view of one embodiment of a nozzle for varying the flow of metal from the metal source to the atomizer.
Figure 3:
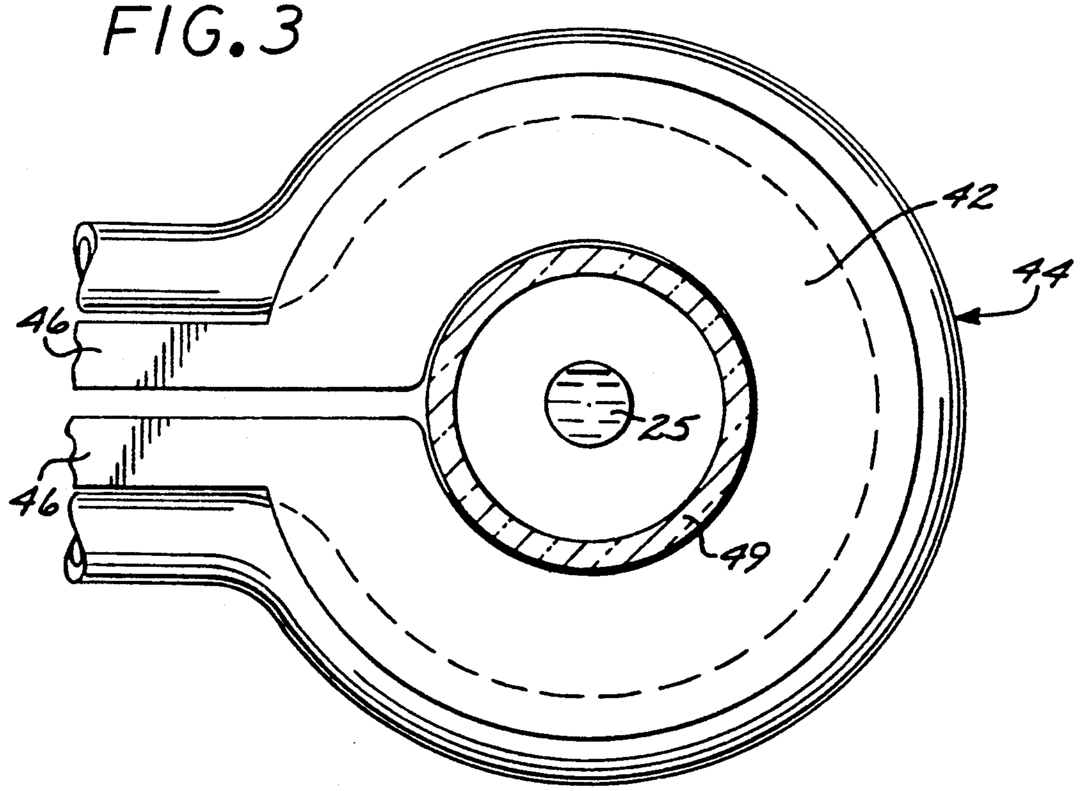
FIG. 3 is a plan view of the nozzle of FIG. 2, taken along line 3—3.

A key component of the system 20 is the nozzle 26. A first embodiment of such a nozzle 26 is illustrated in FIGS. 2 and 3. The nozzle 25 includes an electromagnetic field piece 42 that induces a pinching field around the stream 25 after it emerges from the source 24. The field piece 42 is a solid piece of metallic conductor, such as copper, in the shape of an inverted funnel with the narrow end upward. The field piece 42 is cooled by an integral cooling line 44 attached to the field piece 42. Cooling may be supplied by an atomizing gas, when powder is the product, or by water from a water source. Optionally, a ceramic tube 49 can be placed over the stream 25, between the stream 25 and the field piece 42, as a failsafe protection in the event that splashing of the stream 25 occurs. For some applications, refractory materials, such as tantalum, molybdenum and tungsten may be preferred when sufficient cooling is not possible.

As shown in FIG. 3, the field piece 42 is split radially at one location, with each side of the field piece 42 being joined to a bus bar 46. The bus bars 46 communicate to a radio frequency (RF) power supply (not shown) that produces power at a frequency of from about 250 to about 350 KHz or higher. The RF signal in the field piece 42 induces a magnetic field, indicated schematically as field lines at numeral 48, that tends to pinch the stream 25 radially inwardly. The higher the power applied, the greater the strength of the magnetic field 48, and the greater the inwardly directed constrictive force applied to the stream 25. The magnetic field therefore can be used to restrict the diameter and thence the flow rate of metal in the stream 25.

Figure 4:
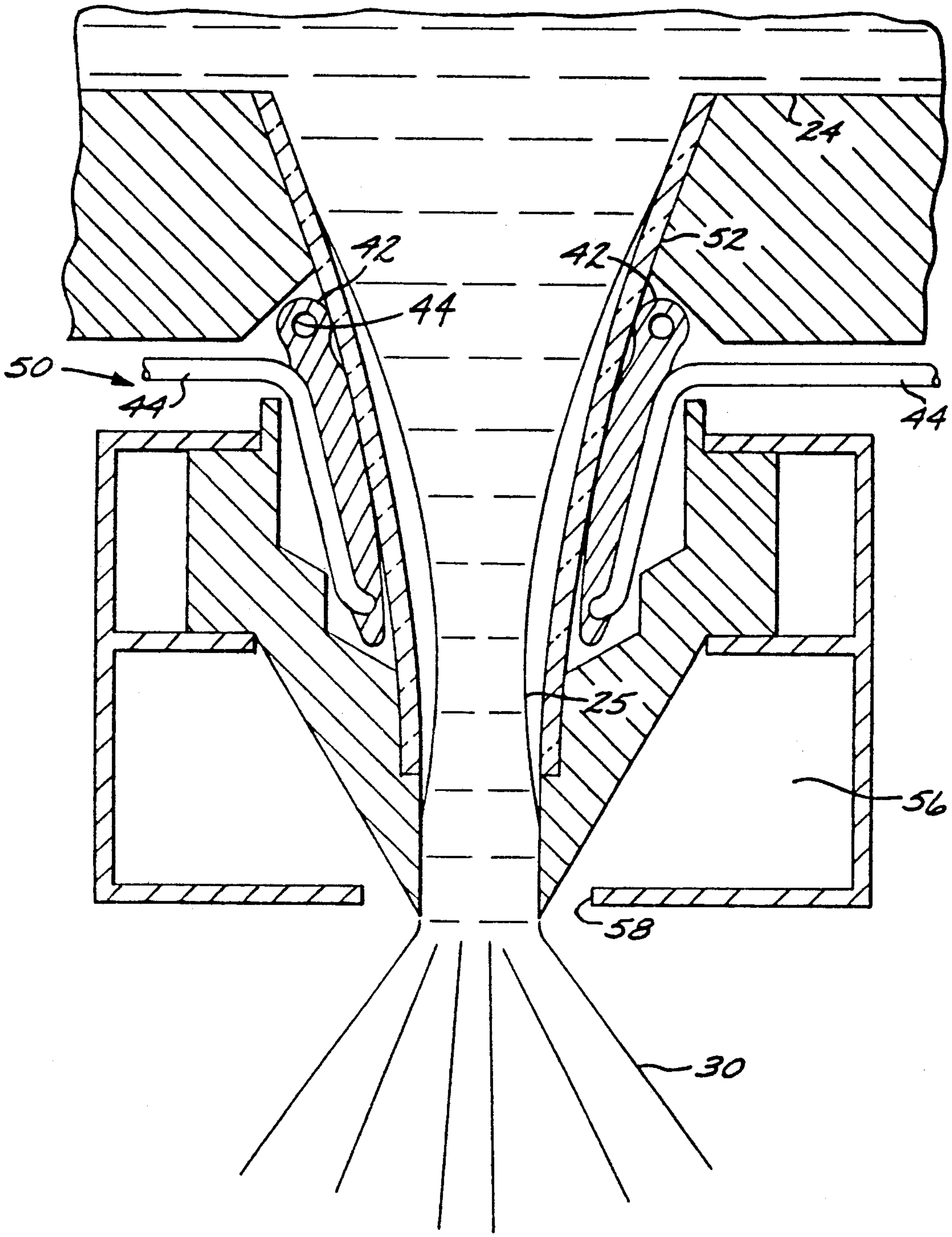
FIG. 4 is a side sectional view of another embodiment of a nozzle for varying the flow of metal from the metal source to the atomizer.

Another embodiment of the nozzle is shown in FIG. 4. A nozzle 50 is a "close coupled nozzle" which combines the metal flow control function and the atomization function into a single unit, and has several design variations relative to the embodiment of FIGS. 2 and 3. The nozzle 50 includes an inwardly tapered sleeve 52 made of ceramic material, through which the metal stream 25 flows from the source 24. Overlying the sleeve 52, a water-cooled induction piece 42 surrounds the stream 25. The induction piece 42 is conical, with the larger end oriented upwardly and is cooled by an integral cooling line 44, which circulates water, or alternatively, when available, gas from an atomizer. The induction piece 42 is connected to a radio frequency power source like that discussed previously. Application of a radio frequency signal to the induction piece 42 induces magnetic fields that pinch the stream 25 inwardly. The pinching field is typically sufficiently strong that the stream 25 is pushed inwardly away from contacting the inner wall of the sleeve 52. This pinching force controls the stream diameter and flow rate in a manner like that discussed previously.

A gas plenum 56 is constructed integrally with the lower end of the nozzle 50 and the sleeve 52. Openings 58 from the gas plenum 56 are located to direct a flow of inert gas (such as argon) from a gas source (not shown) inwardly at an downward angle to impinge against the stream 25. The gas flow atomizes the stream 25 to form the spray 30.

The preferred nozzles discussed here with respect to FIGS. 2–4 have the characteristic that increased pinching or constriction of the metal stream is accomplished by increasing the RF power to the electromagnetic field piece or coil in the nozzle. Mechanically adjustable nozzles could equivalently be used, but their response to command signals would likely be slower than desired for the applications of interest.

Figure 5:
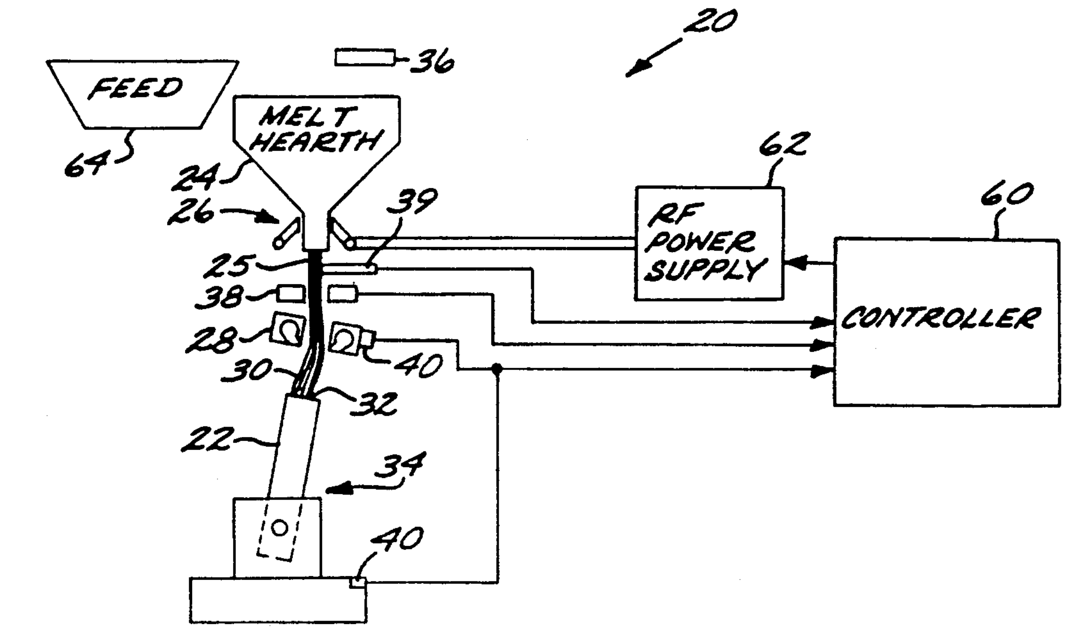
FIG. 5 is a diagrammatic representation of a control system for varying the metal flow responsive to the position of the metal spray.
Figure 6:
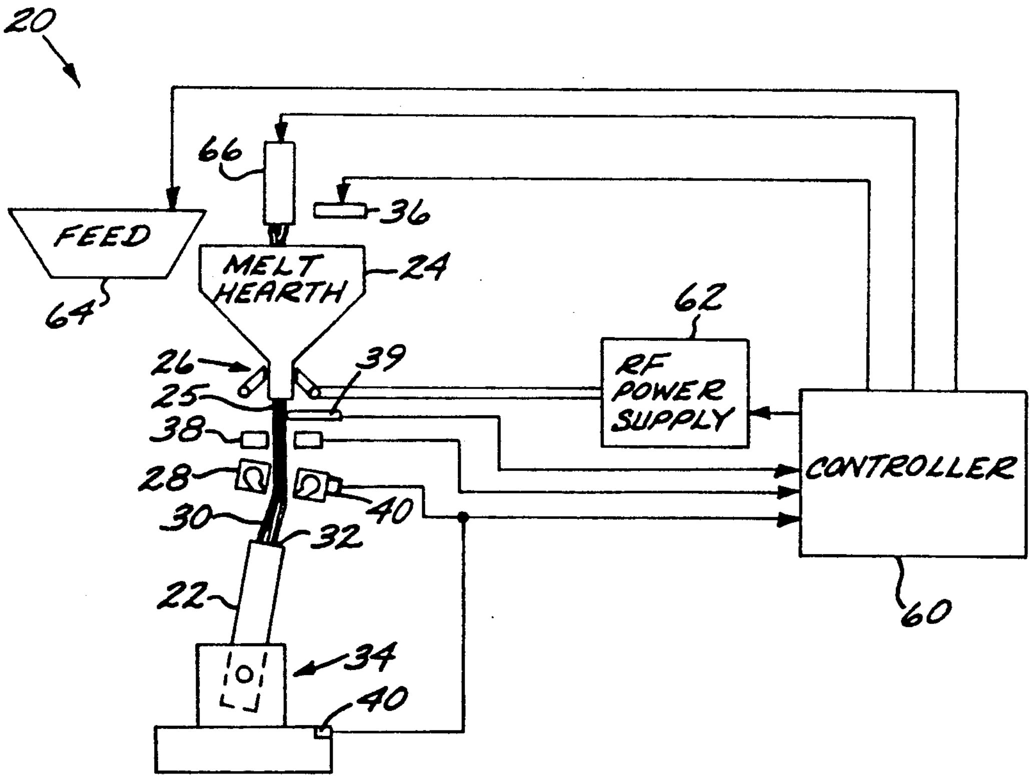
FIG. 6 is a diagrammatic representation of a control system for varying the metal flow responsive to the operation of the metal source.
Figure 7:
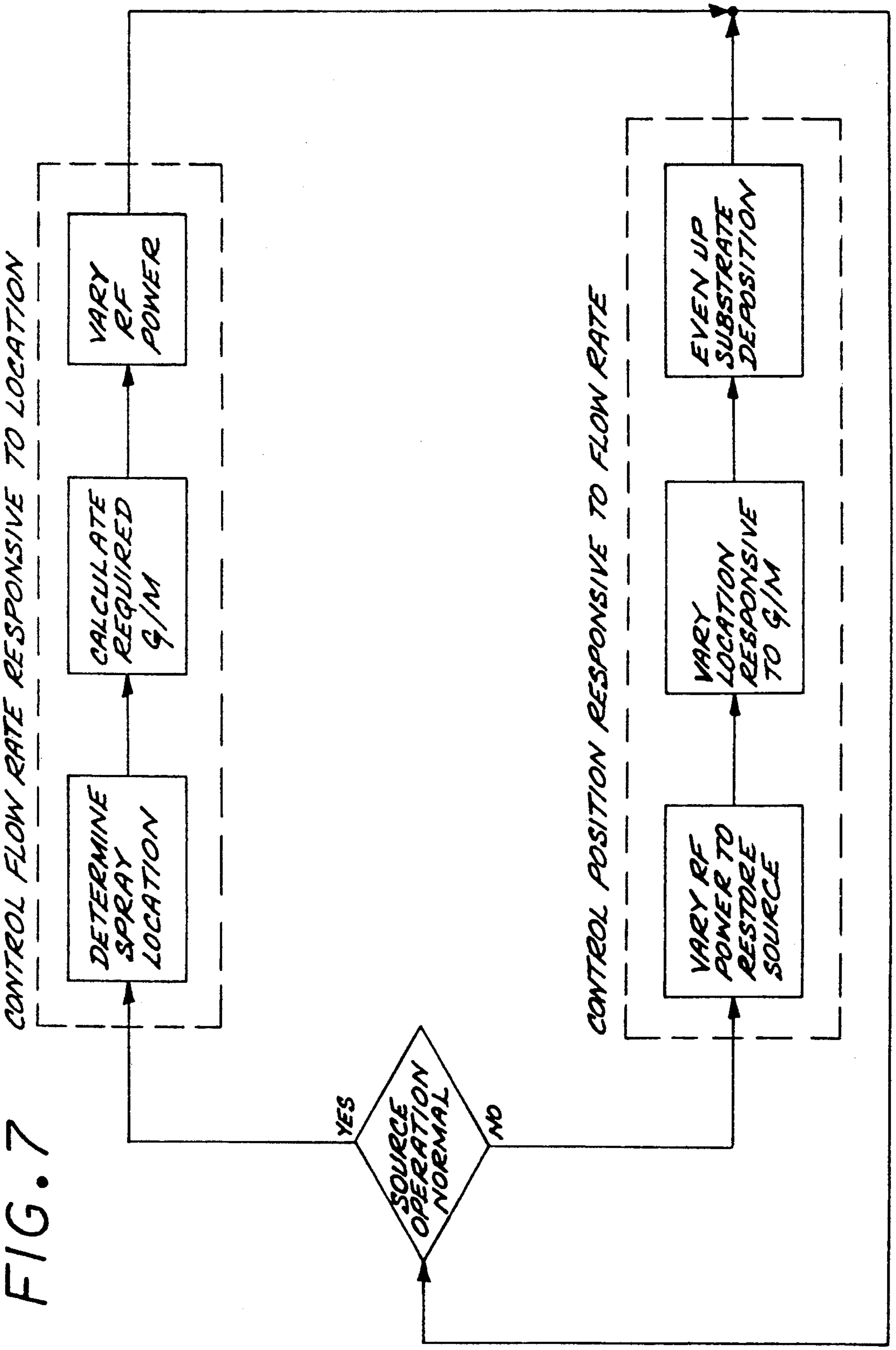
FIG. 7 is a block diagram of a control system for controlling the metal spray apparatus.

The system 20 may be operated in several ways to achieve different objectives during various phases of system operation. FIGS. 5 and 6 illustrate two different control modes. In each figure, the hardware components are identical, but the control modes are different. (The nozzle arrangement of FIGS. 2–3 has been used in FIGS. 5 and 6 for illustrative purposes, but the nozzle arrangement of FIGS. 4, or other nozzles, could be used.) FIG. 5 illustrates a situation wherein the source 24 is operating within normal steady state limits, while FIG. 6 illustrates a situation wherein the source 24 has fluctuated (or been intentionally perturbed) outside of normal steady state limits. FIG. 7 illustrates in block diagram form the interrelation of the two control modes.

Referring to FIG. 5, the relative position of the spray 30 and the substrate 32 is determined from measurements of the position sensors 40 in the gas ring 28 or its actuating system (if a movable gas ring is used) and the holder 34. These measurements are provided to a controller 60, which is typically a programmed microprocessor. From the sensor measurements, the position of the impact of the spray 30 against the substrate 32 is determined by a conventional calculation within a frame of reference. Thus, for the example discussed earlier, it may be determined whether the main part of the spray 30 is striking an inner portion of the billet near its centerline, or an outer portion of the billet near its periphery, or somewhere between the two extremes. The movable elements are driven by another portion of the system, not shown, to cover the entire surface of the substrate with the sprayed metal. The position measurements may be taken from motor settings of the drive system. Although not strictly required, it is preferred to continuously monitor the diameter of the melt stream 25 using the sensor 38 and its temperature using the sensor 39.

From the position of the spray 30 relative to the substrate 32, the required metal flow is determined. The metal flow as a function of position is typically determined from start-up trails. Thus, in a number of test pieces formed prior to production operations, the macrostructures and microstructures as a function of position resulting from various metal flows are determined. Acceptable metal flow limits as a function of position are thereby determined. It would, of course, be preferable to be able to predict the required metal flow from thermal and mass flow models of the spraying operation. However, at the present time such models are not sufficiently sophisticated to be relied upon fully without experimental verifications.

Whatever technique is used, the result is a "mapping" of required metal flow in the stream 25 as a function of relative position of the spray and the substrate. In other calibration and start-up tests, the power required to the nozzle 26 to adjust stream diameter in order to achieve particular metal flows is determined. Using the map of metal flow requirements and the calibration between applied power and metal flow rate, the controller 60 sends a command signal to an RF power supply 62, which in turn applies the commanded power level to the nozzle 26.

Thus, as the spray 30 is scanned across the surface of the substrate 32, the metal flow rate is adjusted upwardly or downwardly as appropriate for a predetermined location being impacted by the spray. Generally, those areas of the substrate that have the largest and most exposed surface areas, such as the outer portions near the periphery, receive the highest metal flow rates. Those inner portions that are more internal and naturally cool more slowly, receive lower metal flow rates. (The relative rate of movement of the spray and the substrate are adjusted responsive to the metal flow rates to achieve a uniform buildup of metal across the surface of the substrate.)

Another control mode is illustrated in FIG. 6. Here, the source 24 is assumed to have varied from its normal steady state operation for any of several reasons, such as startup/shutdown, thermal variations, reduced metal head, etc. The melt sensor 36 provides a signal to the controller 60 as to the nature of the variation, and the controller 60 responds to avoid damage to the system and to maximize production of product of good quality.

For example, the melt level in the source 24 may be sensed by the melt level component of sensor 36 to be too low. To prevent the source 24 from being completely drained of molten metal, which would pose a risk of damage to the components and make startup difficult, the controller 60 commands the RF powder supply to increase the power to the nozzle 26 to reduce the flow rate of the metal in the stream 25. Simultaneously, the controller 60 commands an increased rate of addition of metal to the source 24 from a feed 64. The metal in the source 24 is therefore conserved until the steady state acceptable operating limits are regained, at which time the system reverts to the control mode of FIG. 5.

When the flow rate of molten metal in the stream 25 is changed responsive to the fluctuation in the source 24, the character of the spray 30 also changes. In the example discussed, the metal flow rate is reduced, the gas-to-metal (G/M) ratio of the spray 30 increases, and the spray becomes cooler. One possible control system response is to reduce the flow rate G of atomization gas to the gas ring 28, to increase the temperature of the spray 30 to its normal range (maintaining a constant G/M ratio.). Consistent with a lower metal flow rate M, the billet withdrawal rate may be slowed to maintain a consistent build-up profile.

Another control system response is to change the location of the deposition in accordance with the previously determined mapping of G/M and location on the billet. Thus, a cooler spray is preferably deposited on the inner portions of the substrate rather than the outer portions. To the extent that the cooler spray is deposited on the outer portions, the final product produces during the fluctuation of the source 24 may not be acceptable. To minimize, and desirably prevent, production of unacceptable product during source fluctuations, the controller 60 commands the gas ring 28 (if movable) and holder 34 to position the spray 30 relative to the substrate 32 so that more of the spray 30 is directed against the inner portions of the substrate than the outer portions of the substrate as long as the low metal flow condition persists during the fluctuation of the source 24. The inner portions therefore build up preferentially to the outer portions. This uneven buildup cannot continue indefinitely, and eventually there will be a preferential deposition on the outer portions to create an even thickness of the deposit of metal.

It is expected that under most conditions the control system of the invention will return the deposition to its normal limits in a sufficiently short time that the uneven deposition is tolerated. Alternatively, the two control approaches may be combined, with the G/M ratio adjusted in conjunction with location of the deposition.

Thus, as indicated in FIG. 7 for the preferred approach, in normal operation the flow of metal is controlled responsive to the position of deposition on the substrate, while under abnormal source operation the flow of metal is controlled responsive to the source conditions. In the latter case, controllable source characteristics such as power input or gas flow, or the position of deposition, are controlled responsive to the metal flow rate.

It will be appreciated that many other control situations may occur, and the system response is within the scope of the controller functions just discussed. For example, a variation in stream temperature as measured by the sensor 39 provokes a response that will bring the temperature back to the steady state value, such as modifying the heat input to the melt from heat sources 66 (typically a plasma torch), and/or temporarily modifying the flow rate of atomizing gas.

The present approach therefore uses a variable metal flow nozzle and instrumented metal deposition apparatus to achieve uniform, high-quality product over the entire substrate and in the final article. It increases the tolerance of the deposition process to fluctuations that can occur in the metal source, preventing damage to the components and producing a good product in spite of the fluctuations. These beneficial results are accomplished in part through control of the spray of molten metal droplets. This invention has been described in connection with specific embodiments and examples. However, it will be readily recognized by those skilled in the art the various modifications and variations of which the present invention is capable without departing from its scope as represented by the appended claims.

What is claimed is:

1. Apparatus for producing an article having a uniform microstructure and a uniform macrostructure by incremental buildup of a metal by deposition of droplets of a metal spray formed from a molten metal stream, onto a substrate, comprising:

(a.) a vessel having water-cooled walls for containing molten metal, the vessel further including a nozzle for discharging a stream of molten metal from the vessel;

(b.) means for forming a metal spray from the stream of molten metal having an inlet for receiving the molten metal stream and an outlet for discharging a metal spray, said means positioned below the nozzle;

(c.) a source sensor positioned above the vessel which detects a temperature of the molten metal in the vessel and transmits a signal indicative of the temperature;

(d.) a source sensor positioned above the vessel which detects a level of the molten metal in the vessel and transmits a signal indicative of the level;

(e.) a stream temperature sensor positioned in proximity to the molten metal stream which detects the temperature of the stream before the stream enters the spray-forming means and transmits a signal indicative of the stream temperature;

(f.) a stream diameter sensor positioned in proximity to the molten metal stream which detects the stream diameter as it exits from the nozzle and transmits a signal indicative of the diameter size;

(g.) a mounting apparatus for positioning the substrate relative to the metal spray;

(h.) at least one mounting apparatus positioning sensor for indicating the position of the substrate within the mounting apparatus and which transmits a signal indicative of the substrate position;

(i.) at least one spray forming means sensor which indicates the position of the spray outlet and transmits a signal indicative of the spray outlet position;

(j.) a controller capable of receiving and transmitting signals, which determines appropriate stream diameter, stream temperature, molten metal level in the vessel, molten metal temperature in the vessel, spray direction and substrate position, and which receives sensor signals and transmits signals in response to the received signals;

(k.) a heat source positioned above the vessel, capable of receiving a signal, for adjusting the molten metal temperature in the vessel in response to the signal transmitted by the controller;

(l.) means for moving the spray forming means, capable of receiving a signal, for changing the direction of the spray in response to the signal transmitted by the controller;

(m.) means for moving the mounting apparatus, capable of receiving a signal, for changing the position of the substrate within the mounting apparatus in response to the signal transmitted by the controller; and (n.) means for adjusting the diameter of the molten metal stream, capable of receiving a signal, for changing the diameter of the molten metal stream in response to the signal received from the controller.

2. The apparatus of claim 1 further including a melt source which provides molten metal to the molten metal-containing vessel.

3. The apparatus of claim 1 wherein the means for adjusting the molten metal stream diameter is a means for generating an electromagnetic field substantially surrounding the nozzle capable of receiving a signal, the field exerting a force on the molten stream and variable in response to a signal from the controller so that the stream diameter is adjusted to a predetermined diameter.

4. The apparatus of claim 1 wherein the heat source positioned above the vessel is a plasma torch.

5. The apparatus of claim 1 wherein the heat source positioned above the vessel is an electron beam gun.

6. The apparatus of claim 1 wherein the means for forming a metal spray from the stream comprises:

a plenum;

a gas source;

a connection between the source and the plenum to permit gas to flow from the source to the plenum;

a gas regulating means positioned between the source and the plenum capable of receiving a signal from the controller for adjusting the flow of gas into the plenum at a predetermined flow rate in response to the controller signal; and a sensor which measures the gas flow rate and transmits a signal indicative of the flow rate to the controller.

7. The apparatus of claim 2 wherein the melt source is capable of receiving a signal and provides molten metal to the vessel as required in response to a signal from the controller to maintain the molten metal at a predetermined level within the vessel.

8. The means for generating an electromagnetic field of claim 3 wherein the means is a water-cooled current-carrying buss bar and an RF power supply.

9. The bus bar of claim 8 wherein the bar is copper.

10. The bar of claim 8 wherein the bar has a rectangular cross-section.

* * * * *